United States Patent [19]
Campbell et al.

[11] 3,765,227
[45] Oct. 16, 1973

[54] APPARATUS FOR THE DETERMINATION OF SURFACE TENSION OF LIQUIDS

[76] Inventors: John Campbell, 4 Hoe Meadow, Beaconsfield; Roger Francis Argyll Freeman, 30 Herons Pl., Marlow; Gwilym Iorwerth Williams, 8 Rosken Grove, Farnham Royal, all of England

[22] Filed: Sept. 27, 1971

[21] Appl. No.: 184,128

[30] Foreign Application Priority Data
Oct. 1, 1970    Great Britain.................... 46,648/70
Apr. 13, 1971   Great Britain..................... 9,191/71
June 9, 1971    Great Britain................... 19,602/71

[52] U.S. Cl. ................................................ 73/64.4
[51] Int. Cl. .......................................... G01n 13/02
[58] Field of Search...................... 73/64.4, 439, 302

[56] References Cited
UNITED STATES PATENTS
2,328,460   8/1943   Kidd ..................................... 73/439
2,654,243  10/1953   Colthup et al. ....................... 73/64.4
2,860,516  11/1958   Bardonnet et al. ................... 73/439

FOREIGN PATENTS OR APPLICATIONS
  594,723  11/1947   Great Britain........................ 73/439
1,257,163   2/1961   France.................................. 73/302
  835,218   2/1952   Germany ............................. 73/64.4

Primary Examiner—Richard C. Queisser
Assistant Examiner—Joseph W. Roskos
Attorney—Beveridge & DeGrandi

[57] ABSTRACT

This invention is concerned with apparatus for the determination of surface tension of liquids and to a method for the continuous or intermittent analytical determination of minor solute ingredients in solution in liquids in cases where such solute ingredients affect the surface tension of the liquid under investigation. The surface tension is determined using a variant of the well-known maximum bubble pressure technique using novel apparatus designed to ensure a substantially flat interface between gas and liquid in one of two tubes used to determine the maximum pressure difference between the two tubes. The apparatus with which the invention is concerned comprises a probe consisting essentially of a first tube having an orifice to provide bubbles of gas in a s teady succession when the apparatus is in use, and a second tube having an opening at its lower end and comprising means to maintain at its said lower end an interface between gas in the second tube and the liquid, the surface tension of which is to be determined, in a substantially horizontal plane, the first and second tubes being mounted in the probe so that the orifice of the first tube and the opening of the second tube are substantially in the same horizontal plane when the probe is in use; means for connecting a supply of gas to each of the two tubes; and means for measuring the pressure difference between the said first and second tubes when determining the surface tension of a liquid.

9 Claims, 10 Drawing Figures

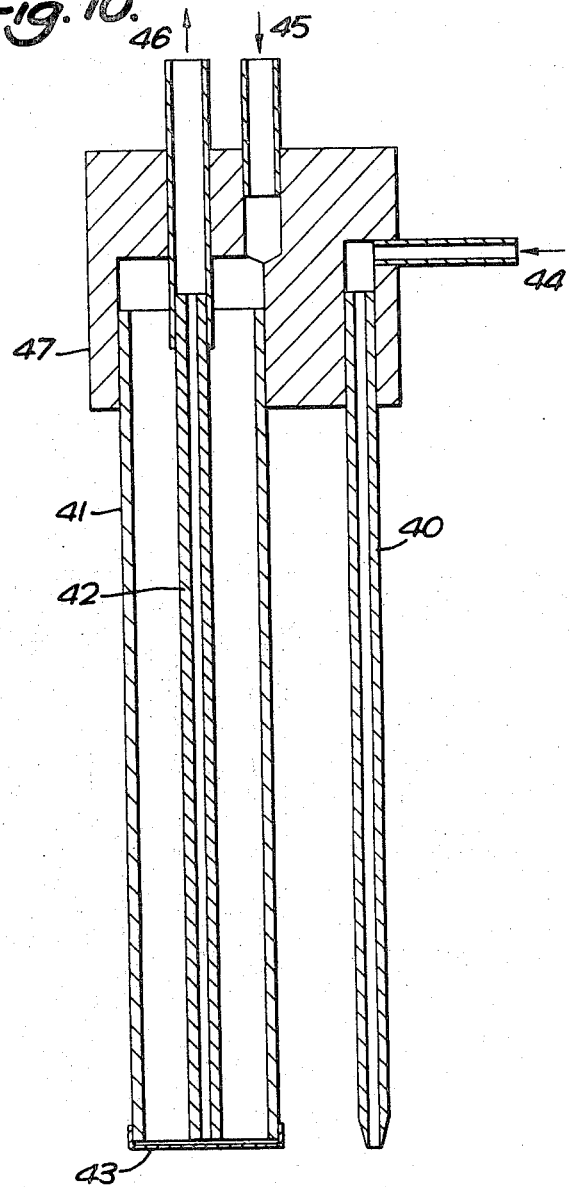

APPARATUS FOR THE DETERMINATION OF SURFACE TENSION OF LIQUIDS

This invention relates to apparatus for the determination of surface tensions of liquids, and to a method for the continuous or intermittent analytical determination of minor solute ingredients in solution in liquids, and in a particular aspect for the determination of such minor solute ingredients in molten metals, utilising their effect upon surface tension.

A knowledge of the chemical composition, and particularly the quantity of oxygen present in a liquid metal is important in many industrial processes. For instance, the deoxygenation by 'poling' of fire-refined copper is continued until the oxygen content has fallen to a predetermined level. In steelmaking, the quantity of free oxygen in the liquid metal is controlled within close limits, the actual values depending on the particular quality of steel desired.

Until recently, molten metals have been analysed by chemical or physical methods which involve withdrawal of a sample, allowing it to cool and solidify, cutting out a small section and subjecting this to standard analytical techniques. This is a time-consuming procedure and may in fact occupy a substantial proportion of the total duration of a rapid modern metal refining or producing process, such for example as rotary furnace copper refining or steelmaking; in any case it has the disadvantage that the process must be stopped and the vessel turned down to allow a sample to be taken. Moreover, truly continuous high-speed processes, such as spray steelmaking, are now being developed, in which continuous monitoring of composition will be virtually essential.

To this end, continuously monitoring oxygen probes have been developed utilising an electrolytic cell principle. Such cells are, however, expensive and have to be replaced periodically as a consequence of erosion by the liquid metal.

The present invention is concerned with apparatus for the determination *in situ* (if need be) of small amounts of solute ingredients in solution in liquids, which depends upon their effect upon the surface tension of the liquid. It is known that, whereas the addition of solutes usually affects the density or specific volume of a solution in a more or less linear manner, small amounts of certain solutes, which tend to concentrate in the surface, have a very pronounced effect upon the surface tension of the solution and are said to be surface active. However, many other solutes have a negligible effect upon this property, and it is to the determination of solutes of the former type that the probe of this invention finds specific utility.

In the case of liquid metals, solutes having a pronounced effect on surface tension, and therefore susceptible to determination by use of the apparatus of this invention, are: for liquid iron, sulphur, oxygen, phosphorus or nitrogen; for liquid copper, sulphur or oxygen; and for liquid aluminium, bismuth, lead, magnesium, antimony and tin.

The respective effects of these solutes in varying proportions is shown graphically in FIGS. 1 to 5, in which:

FIG. 1 illustrates the effect of oxygen on the surface tension of iron at 1550°C., FIG. 2 illustrates the effect of sulphur on the surface tension of iron at 1550°C., FIG. 3 illustrates the effect of oxygen on the surface tension of copper at the indicated temperature, FIG. 4 illustrates the effect of sulphur on the surface tension of copper at the indicated temperture, and FIG. 5 illustrates the effect on the surface tension of aluminium of the indicated elements at 700°C.

FIG. 10 illustrates a further embodiment of the invention employing a membrane in lieu of direct gaseous contact with a liquid.

Figure 1:
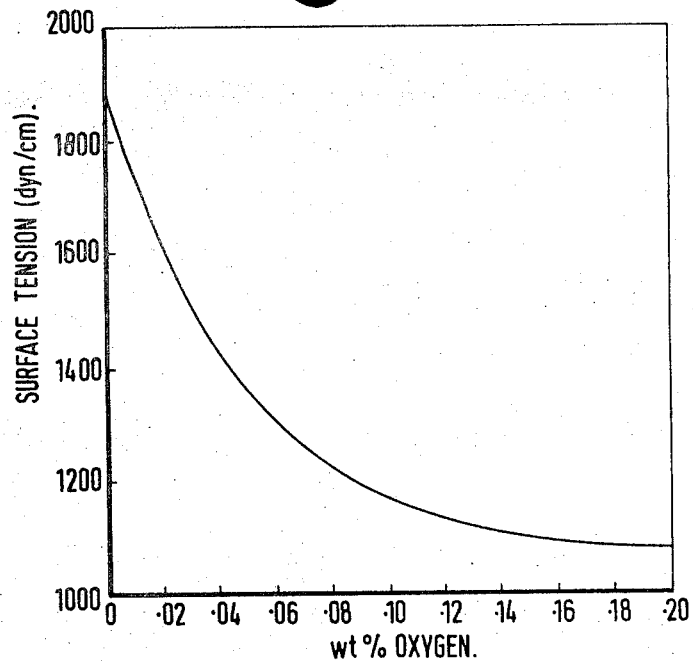
Figure 2:
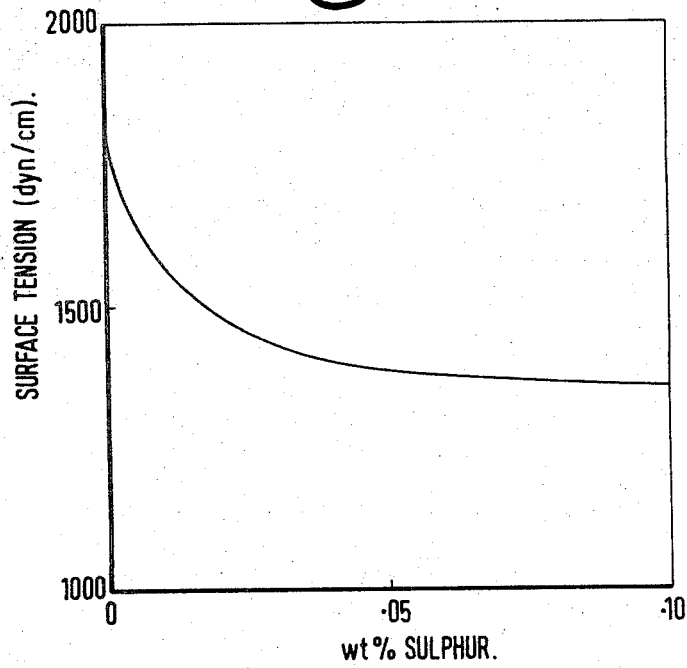

It can be seen, from these Figures, that for example, copper as a solute has a negligible effect upon the surface tension of liquid aluminium, and is not therefore susceptible to determination therein by the procedure of this invention.

Although the apparatus of this invention is described with particular reference to the analysis of molten metals, it will be clear that it can readily be employed with solutions of other surface active materials, such for example as aqueous solutions of surfactants, or lubricating oils containing surface active additives. Also the apparatus of this invention may be used to determine the alcohol level of blood or urine.

The apparatus of this invention depends for its operation upon what is known as the maximum bubble pressure technique for determining surface tension, whereby the pressure of an inert gas required to form a bubble at an orifice submerged beneath the liquid is determined. This pressure is known to be related to the surface tension by the following equation:

$$P = 2\gamma/r + \rho g h \qquad 1$$

where P is the maximum gauge pressure observed, $\gamma$ the surface tension, $\rho$ the density of the liquid, $r$ the minimum radius of the bubble as it is being formed at the orifice, $h$ its depth of immersion and $g$ the acceleration due to gravity.

Difficulties in applying this technique to liquid metals during refining and other manufacturing processes arise from turbulence and from the possible presence of slag or dross upon the liquid surface, thus rendering the value of h imprecise over the period (20 seconds or more) taken by the bubble to form. In some processes the absolute level of the metal may also be varied intermittently or continuously by the input of fresh metal. Furthermore, the density of the melt may not be accurately known.

It is consequently not possible to obtain accurate values for surface tension by this technique using a single orifice only, whether this is maintained in a fixed position or at successively varying depths.

Previous experimenters have overcome these difficulties by employing two tubes of different radii $r_1$ and $r_2$ immersed to substantially the same depth h. From equation 1 it is quickly seen that the differential pressure between the two tubes when the maxima in the pressure cycles coincide is:

$$P_1 - P_2 = 2\gamma (1/r_1 - 1/r_2) \qquad 2$$

so that the density $\rho$ and the depth $h$ need not be known. However, this technique involves further difficulty since the bubbles from the two tubes are formed at different rates. The lack of coincidence of the pressure maxima causes the maximum pressure differential to be difficult to measure.

According to the present invention, we have overcome these difficulties by providing apparatus for determining the surface tension of a liquid by the maximum bubble pressure technique, which apparatus comprises a probe consisting essentially of a first tube having an orifice to provide bubbles of gas in a steady succession when the apparatus is in use, and a second tube having an opening at its lower end and comprising means to maintain at its said lower end an interface between gas in the second tube and the liquid, the surface tension of which is to be determined, in a substantially horizontal plane, the first and second tubes being mounted in the probe so that the orifice of the first tube and the opening of the second tube are substantially in the same horizontal plane when the probe is in use, generally in the vertical position; means for connecting a supply of gas to each of the two tubes; and means for measuring the pressure difference between the said first and second tubes when determining the surface tension of a liquid.

Means for maintaining the said interface between the gas and the liquid in a substantially horizontal plane include the provision of an internal tube, sustantially concentric with the second tube which acts, when the apparatus is in use, as a gas leak whenever the gas/liquid interface tends to become convex.

In one embodiment of the apparatus according to this invention the apparatus is constructed so that the said first tube is disposed within the said second tube and has a U-bend at its lower end so that its orifice provides, when the apparatus in in use, a directly upward stream of bubbles.

In a further embodiment of the apparatus according to this invention the apparatus is constructed so that the said first tube is disposed within the said second tube with its orifice in substantially the same horizontal plane as the opening of the second tube and escape means are provided within the second tube to form an escape path for the steady succession of bubbles which are provided by the said first tube, when the apparatus is in use, the escape means being disposed also within the said second tube. It is preferred, in such an embodiment, that the said escape means also constitute the means to maintain the interface between the gas and the liquid in the required horizontal position. Preferably the said first tube is provided with a U-bend at its lower end.

The invention also comprises a method for the continuous or intermittent determination of the surface tension of a liquid, and consequently of the concentration of one or more surface active solutes dissolved therein, by immersing the said probe in the liquid and observing the maximum differential pressure between the two supplies of inert gas to the two principal tubes of the probe.

When the gas/liquid interface of the said second tube is flat, it can be seen that equation 2 becomes $$\gamma = (P_1 - P_2)r_1/2 \qquad 3$$

One embodiment of apparatus will now be described with respect to the determination of the concentration of oxygen in liquid copper with reference to FIG. 6. Alumina tubes 10, 11 and 12 of internal radii approximately 1, 5 and 1mm respectively, and length approximately 300 mm, are mounted in a head 13. The tip 14 of tube 10 is provided with an acurately determined radius by external chamfering to produce an accurately circular knife-edge. Alternatively the tip 14 of tube 10 could be chamfered internally, or both internally and externally. Tubes 11 and 12 are ground to form sharp clean cut edges in order to provide, when immersed in a liquid, a meniscus which deviates from the horizontal as little as possible.

Inert gases, i.e. gases which will not react with the liquid copper or probe materials, are introduced via tubes at 15 and 16. The supply at 15 is, in this embodiment, a specially purified helium containing less than 1 part per million of oxygen, water vapour or other surface active contaminants. The supply at 16 need not be so pure, and commercially pure nitrogen is suitable.

A porous plug 17 of aluminous material is positioned in the entrance to tube 12 to prevent the entry of liquid metal whilst not greatly restricting the free flow of gas.

The rate of flow of gas to tube 10 is controlled so as to cause bubbles to form at the orifice of tube 10 at an optimum rate approximately in the range 0.5 to 2.0 bubbles per minute.

The rate of flow of gas to tube 11 is maintained reasonably constant, in the range 1 – 2 ml/minute. This is controlled by a flow meter (not shown) which monitors the escape of gas at 18.

The differential pressure $(P_1-P_2)$ is measured by a manometer 19 containing a silicone oil having good mobility, and an extremely low vapour pressure, which avoids contamination of the gas supplies.

For oxygen in liquid copper at 1100°C., at low oxygen contents, a change in surface tension of 1 percent, which is detectable by this probe, corresponds to a change in oxygen concentration of approximately five parts per million. The probe is particularly suitable for the determination of oxygen in the range 10 – 2,000 parts per million. It is also insensitive both to changes in depth of immersion in the liquid under investigation between 10 and 150 mm. and to changes in density of the liquid.

The maintenance of the flatness of the gas/liquid interface, which is a simple meniscus, in tube 11 is achieved by the central tube 12. Tube 12 allows gas to escape from tube 11 as soon as the gas/liquid interface which forms the meniscus extends beyond the horizontal to take up a convex form: the escape of gas causes the pressure in tube 11 to fall so that the meniscus returns to the flat position, sealing off the escape of gas. The apparatus requires no moving parts, valves or switches since the meniscus itself acts as a control valve. The apparatus relies only on a constant and small supply of gas. The rate of flow can be of the order of 1 ml/min. (The tube will continue to function at rates up to 30 ml/min. but above this level undesirable fluctuations in flow are sometimes observed). The low rate of flow ensures that the fall in pressure along the gas supply lines due to viscous or turbulent effects is negligible.

The maintenance of the flatness of the meniscus can be achieved by other methods such as:

i. The movement of the meniscus below the horizontal as a result of a constant flow of gas into tube 11 breaks the circuit formed by two electrical contacts which dip into a metallic liquid at that point. This signal operates a valve which allows gas to escape from tube 11. The completion of the electrical circuit when the meniscus returns to the horizontal closes the escape valve so that the process is repeated.

ii. A similar system involving the use of the control of gas flow to tube 11 by separate valves, but avoiding any contact with the surface of the liquid, is by the projection, via light pipes and lenses, of parallel light onto the surface of the liquid. The intensity of the reflection, focused onto a photoelectric cell, thermopile, or equivalent device, would be an indication of the flatness of the surface. These forms are not described in detail but illustrate the comparative simplicity of the preferred concentric tube device described above.

The material of construction of the tubes of the probe should not be wetted by the liquid, so that there is no risk of capillary rise within them. In the case of liquid copper, alumina is a suitable material. At very high temperatures (above 1300°C) and oxygen contents (above 4000 parts per million), however, alumina is wetted by liquid copper and would therefore be unsuitable.

In the case of the use of the probe in a particularly turbulent liquid, or where other adventitious bubbles may interfere with the menisci at the tips of the tubes, the probe may be partially protected in some kind of casing, of similar inert material to that of the tubes, and suitably provided with holes of such a size as to allow a sufficient amount of free ingress and egress of liquid for the liquid within the protective casing to be representative of the bulk liquid to within acceptable limits.

The tip of tube 10 can be chamfered from either the inside or outside edge, or from both to give some intermediate radius, depending on the size of the pressure differential which is required. In this way an adjustment of the radius can be made to give an optimum, near full-scale, reading on the pressure monitoring equipment.

The differential pressure is measured at some convenient point in the gas supply lines. Although in FIG. 6 is is represented as a simple manometer 19, it is more convenient to use a pen recorder of a type operated directly by the difference in pressure via a mechanical linkage from a bellows or similar mechanism.

It is desirable to calibrate the probe with reference to a particular liquid/solute system by chemical analysis for the solute or solutes in question, in which case equation 3 is used in the form:

$$\gamma = k (P_1 - P_2)$$

where $k$ is a constant determined from the independent chemical analysis. For greatest accuracy, the probe is calibrated in a pure liquid whose conditions, particularly temperature and wetting characteristics, correspond closely to the system which it is desired to monitor. For instance for a probe intended to monitor the oxygen content in liquid copper, calibration is most conveniently carried out in pure liquid silver or gold at the same temperature. The surface tension of these pure liquids is accurately known. The radius of the tip of tube 10 can be measured so that from equation 3, therefore, it is possible to predict a value of $(P_1-P_2)$. Tube 10 is then adjusted in height with respect to tubes 11 and 12 to obtain this predicted value. This adjustment is usually slight; not in excess of 1 or 2 mm, and corrects for both the effect of the size of bubbles from tube 10, which are in any case slightly distorted under gravity, and any slight residual curvature of the liquid meniscus in tube 11 which is altering the effective depth of immersion of tube 11.

In simple binary systems concentrations can be read directly from graphs such as those shown in FIGS. 1 to 5. However, such systems are rarely encountered in practice: it must be noted that where more than one surface active solute is present (as for example oxygen, sulphur and phosphorus in most liquid steels) their effect on surface tension is not necessarily additive. The probe may still be useful in such a situation if the extra surface active materials are known or are constant within acceptable limits.

Figure 7:
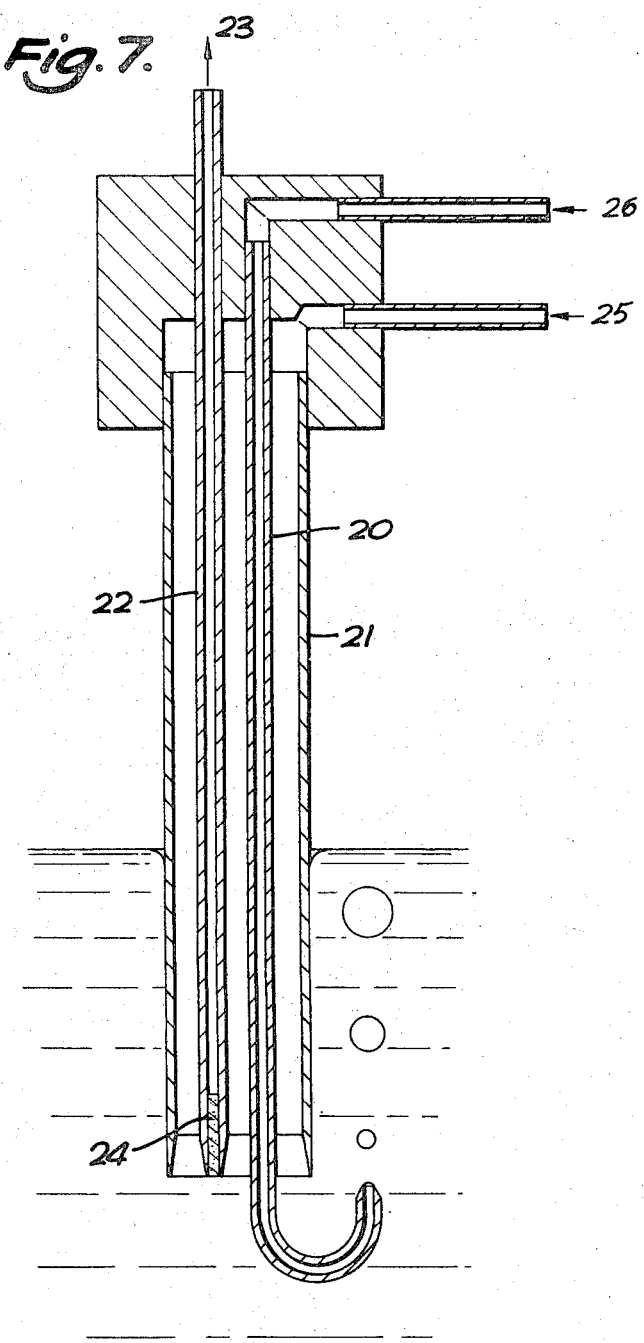
FIG. 7 is a diagramatic sectional view of a second embodiment of the invention.

A specific embodiment of the invention in which the said first tube is disposed within the said second tube and has a U-bend at its lower end so that its orifice provides, when the apparatus is in use, a directly upward stream of bubbles will now be described by way of example with reference to FIG. 7. The steady succession of bubbles are formed at the tip of tube 20. This tube is protected within tube 21 except for the curved tip which is in contact with the liquid well below its surface. A meniscus is formed at the tip of tube 21 on immersion of the probe in the liquid, and the meniscus is maintained flat by the escape of gas up tube 22 to atmosphere 23 via the filter 24. The maximum pressure difference between the two supplies of gas at 25 and 26 is a direct measure of the surface tension.

Figure 6:
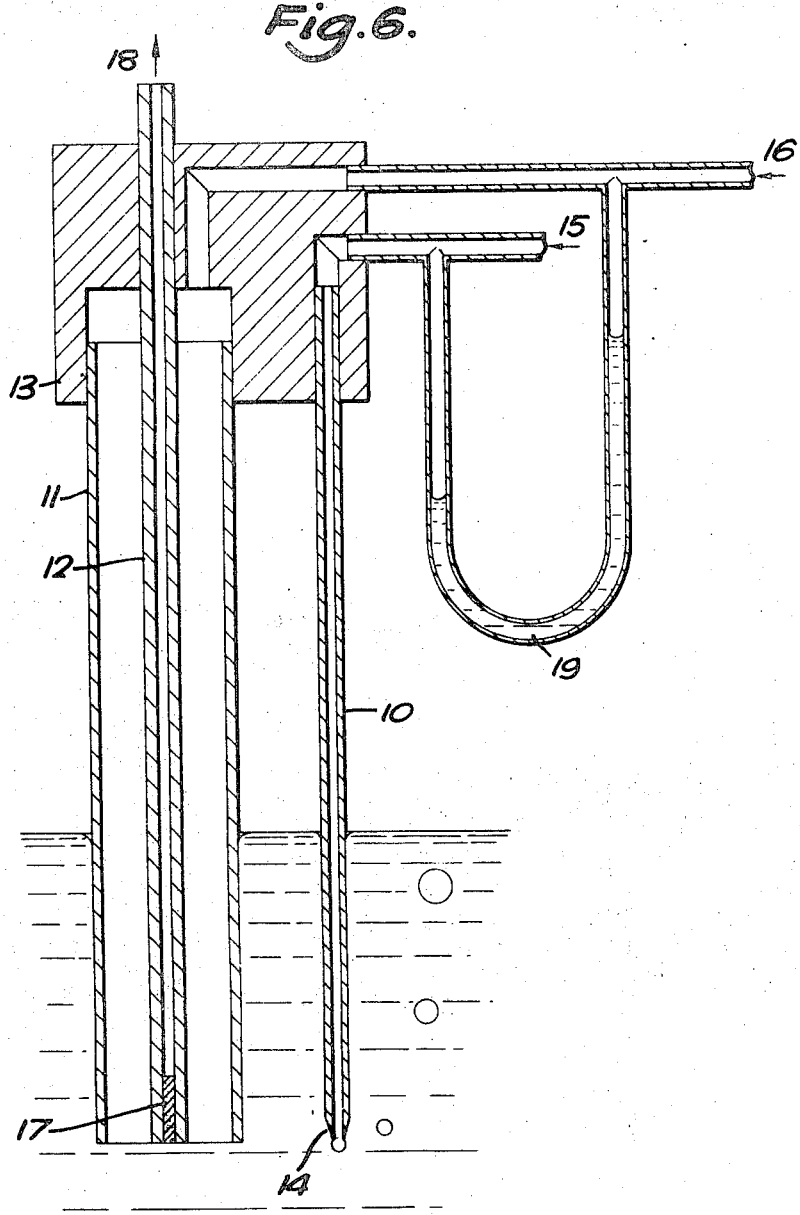
FIG. 6 is a diagramatic sectional view of one embodiment of the invention.

The advantages of this design over those described and illustrated with respect to the embodiment of FIG. 6 are:

i. Occasionally bubbles do not form properly and break cleanly away from the tip of a downward pointing tube, but escape along non-wetted paths up the side of the tube. The pressure readings then become low and variable.

ii. When the tubes are dipped into aggresive liquids, the rate of attack is often seen to be most severe at the surface of the liquid. To avoid rapid failure of the small tube from this cause some protection is required. This is especially true for metallic tubes in liquid copper, although alumina tubes in liquid copper are not subject to this disadvantage.

iii. The narrow tube is vulnerable to mechanical damage. This can occur not only by accident, but in the case of the use of the probe in molten materials by the heavy build up on solidified material on the cooler part of the tube above the level of the liquid. The build up of material is a consequence of the spray of liquid from bubbles which rise and burst at the surface of the liquid near to the small tube. The weight of solidified material can become sufficiently large to break the tube.

If the surface tension of a liquid such as liquid copper is to be determined, the tubes 20, 21 and 22 are preferably made of Fe-27% Cr alloy which is resistant to attack by copper. An advantage to be gained by the use of an all-metal probe as shown in FIG. 7 is that the probe is resistant to thermal shock so that it can withstand rapid immersion in a molten metal. If thermal shock resistance is not required then tubes 21 and 22 are more suitably constructed from alumina, or other non-wetted material which is resistant to attack by the liquid. The curved form of tube 20 would cause it to be difficult to supply in alumina or other refractory ceramic material. A metal tube would therefore be desirable in such a case.

The embodiments of the invention in which the said first tube is disposed within the said second tube with its orifice in substantially the same horizontal plane as the opening of the second tube and escape means are provided within the second tube to form as escape path for the steady succession of bubbles which are provided by the said first tube, when the apparatus is in use, the escape means being disposed also within the said second tube will now be described by way of example with reference to FIG. 8. In this embodiment the bubbles are formed at the tip of tube 30. This narrow, more fragile tube is protected within concentric outer tubes 31 and 32. The bubbles formed by tube 30 are collected in a recess formed within a material which is not wetted by the liquid. Porous alumina is a suitable material for liquid copper, and porous P.T.F.E. or Nylon are suitable materials for most aqueous solutions. The gas in the bubbles passes through the porous material and escapes to atmosphere via the escape tube 32. This same tube 32 is the escape tube for the excess gas which is allowed to escape from the interior of tube 31 in order to maintain the meniscus at the tip of tube 31 flat. It will be appreciated therefore, that tube 32 must also be of non-wetted material so that gas may leak easily over its orifice into it via the filter 33. The maximum pressure difference between the two supplies of gas at 34 and 35 is a direct measure of the surface tension. The mounting block 36 has channels provided so that the required tubes can be fitted, as shown. Inlets 34 and 35 permit the supply of the gas streams to the tubes 30 and 31, respectively. Outlet 37 permits the leakage of gas which passes filter 33.

Figure 8:
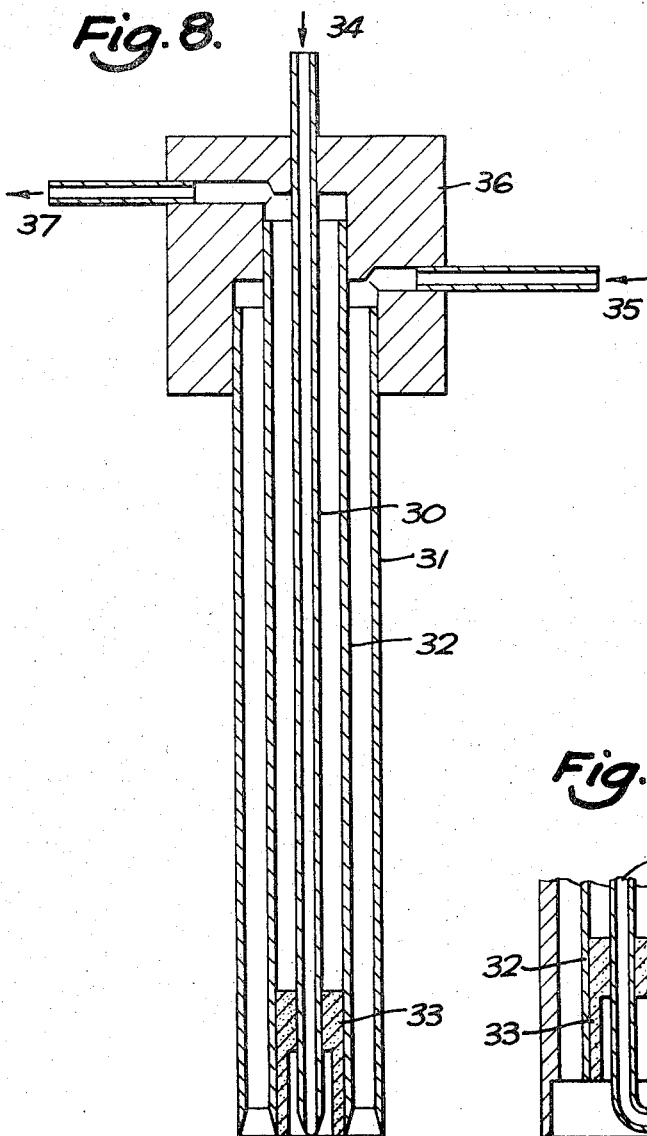
FIG. 8 is a sectional view of a further embodiment of the invention.
Figure 9:
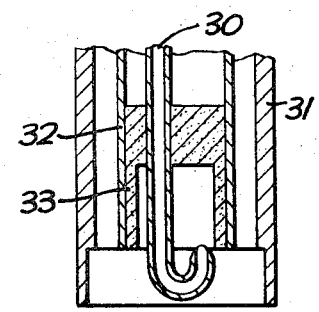
FIG. 9 is a detail of a modified apparatus according to FIG. 8.

A modification of the embodiment of FIG. 8 is illustrated in FIG. 9, in which the tip of the tube 30 is turned through 180° to form a U-bend to provide bubbles which form readily and detach freely, thus generating the full maximum pressure. Under some circumstances, if the tip of tube 30 is not wetted by the liquid, then bubbles are not formed by tube 30 in FIG. 8, but instead the gas leaks away along non-wetted paths up the side of the tube. When this happens then low and erratic pressure readings are observed. In the example shown in FIG. 9 tube 31 may be optionally extended as shown to provide mechanical protection for tube 30.

The advantages of the embodiments described and illustrated with reference to FIGS. 8 and 9 over the earlier described embodiments are neatness, mechanical strength, and the absence of any difficulties arising from the splashing which accompanies the bursting of bubbles at the surface of the liquid near to the probe.

In a further form of the present invention the means to maintain the interface between the gas and the liquid in the substantially horizontal plane comprises an inert flexible membrane fitted over the open lower end of the said second tube: in other words the orifice, at which the gas/liquid interface is maintained flat, is covered with the inert flexible membrane which is unattacked and substantially impervious to both the gas and the liquid and which therefore prevents any possibility of liquid entering and blocking the tube which is provided for the escape of excess gas whether the liquid wets the said escape tube or not.

The advantage of this aspect of the present invention which uses the membrane is evident when the instrument is used for aqueous or oil-based solutions. Oils in particular wet practically all solids so that it is not possible to use a design of the probe which contains an escape tube whose orifice is in direct contact with the liquid. However, by the simple expedient of providing a flexible membrane of thin rubber or plastic sheet material over the orifice of the tube, such problems are solved. The membrane acts as the pressure release valve in the same way that the liquid surface was originally intended to do in the case of non-wetting liquids. Also, of course, it keeps the liquid separated from the escape gas and the escape tube.

An example of this aspect of the present invention which is intended for use in aqueous solutions is illustrated in FIG. 10. Bubbles are blown from the tip of tube 40 as before, but the orifice of tube 41 is sealed against entry of liquid by a flexible membrane 43 of thin rubber sheet. The modulus of rigidity of the membrane is kept as low as possible by ensuring that the membrane is not stretched in tension across the orifice, otherwise a large excess pressure would have to be built up inside tube 41 before the diaphragm would flex sufficiently to allow gas to escape up escape tube 42 to atmosphere via outlet 44. The surface tension is assessed, as before, by measuring the maximum pressure differential between tubes 40 and 41 for example by using a manometer between inlets 45 and 46 for the gas streams. The tubes are mounted in a single block 47.

This aspect of the present invention is not applicable to those designs of surface tension probe in which the first tube is within the second tube.

Figure 3:
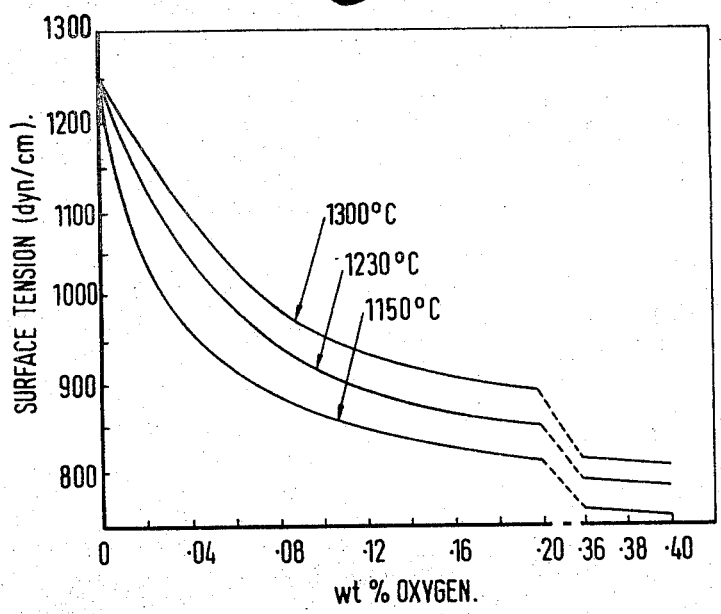
Figure 4:
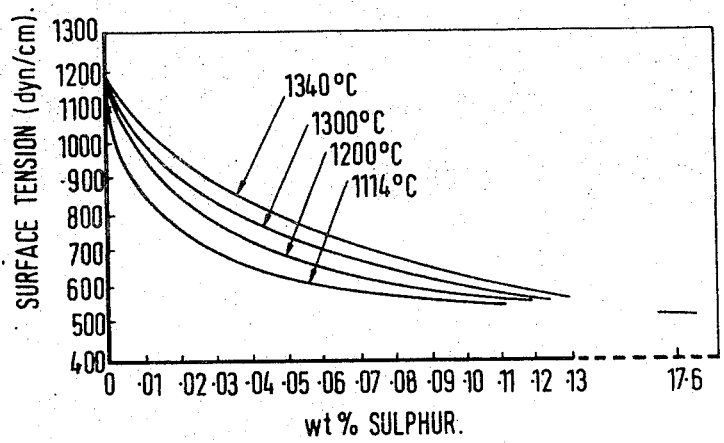
Figure 5:
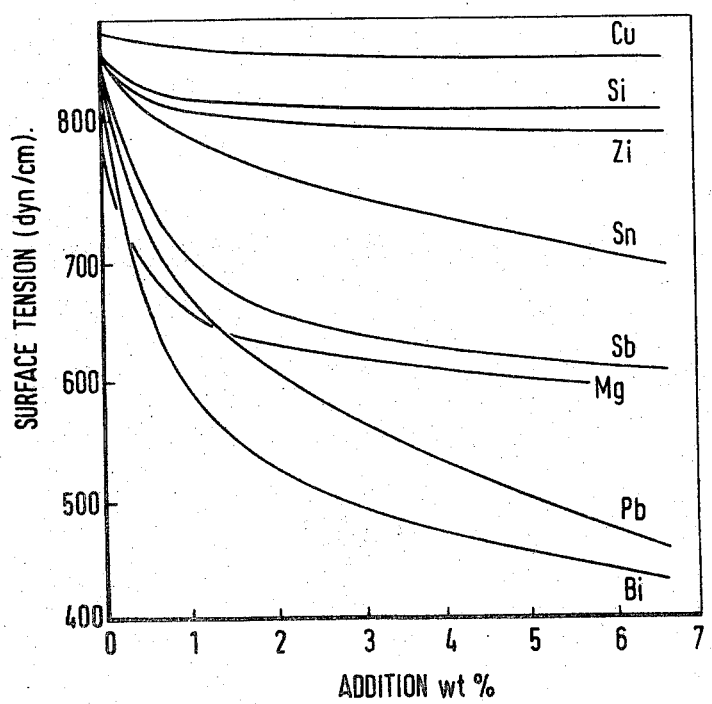

With liquid copper at 1150°C in a graphite crucible covered with granules of charcoal, a maximum pressure difference recorded by apparatus having a probe according to the invention was 63,600 dyn/cm². Since the radius of the tip of the probe was 0.0362 cm, the surface tension of the liquid was:

$$\gamma = (63,600 \times 0.0362)/2 = 1150 \text{ dyn/cm}$$

which was found to correspond to an oxygen content of 80 ppm using FIG. 3.

When the charcoal cover was removed and air blown on to the surface of the melt, the pressure difference was observed to fall rapidly to 52,600 dyn/cm². Following the same type of calculation as above, the surface tension was then found to be 950 dyn/cm with a corresponding oxygen content of 400 ppm.

Although to be strictly accurate only the maximum difference in pressure between the two gas streams should be read, it is found in practice that it is often possible to read the average difference in pressure in order to obtain values of the surface tension to within a very good approximation.

We claim:

1. Apparatus for determining the surface tension of a liquid by the maximum bubble pressure technique, which apparatus comprises two tubes, means for connecting a supply of gas to each of the two tubes; and means for measuring the pressure difference between the said first and second tubes when determining the surface tension of a liquid the apparatus being characterised by a probe consisting essentially of a first tube having an orifice to provide bubbles of gas in a steady succession when the apparatus is in use, and a second tube having an opening at its lower end and comprising means to maintain at its said lower end an interface in a substantially horizontal plane between gas in the second tube and the liquid, the surface tension of which is to be determined, the first and second tubes being mounted in the probe so that the orifice of the first tube and the opening of the second tube are substantially in the same horizontal plane when the probe is in use.

2. Apparatus as claimed in claim 1, wherein the means for maintaining the interface between the gas and the liquid in a substantially horizontal plane comprises an internal tube positioned substantially concentrically within the second tube which acts, when the apparatus is in use, as a gas leak whenever the gas/liquid interface tends to become convex.

3. Apparatus as claimed in claim 1 wherein the said first tube is disposed within the said second tube, and has a U-bend at its lower end so that its orifice provides, when the apparatus is in use, a directly upward stream of bubbles.

4. Apparatus as claimed in claim 1 wherein the said first tube is disposed within the said second tube with its orifice in substantially the same horizontal plane as opening of the second tube and escape means are provided within the second tube to form an escape path for the steady succession of bubbles which are provided by the said first tube, when the apparatus is in use, the escape means being disposed also within the said second tube.

5. Apparatus as claimed in claim 4, wherein the said escape means also constitute the means to maintain the interface between the gas and the liquid in the required horizontal position.

6. Apparatus as claimed in claim 4 wherein the said first tube is provided with U-bend at its lower end.

7. Apparatus as claimed in claim 1, wherein the cross-sectional area of the said second tube to that of the said first tube is within the range 1000 to 100:1.

8. A method of determining the surface tension of a liquid in a two-tube balancing arrangement, of which one tube has an orifice for immersion in the liquid to supply gas bubbles when supplied with a gas and a second tube having an opening at a submerged end for presenting an interface with said liquid when therein, comprising submerging said tubes to a depth such that said orifice and said opening are at equal depths in the liquid to be measured, supplying a gas to said orifice to maintain a steady succession of ejected bubbles, and supplying gas to said second tube to maintain said interface at said opening in the form of a substantially horizontal meniscus, and measuring the difference in pressure in said first and second tubes.

9. A method as claimed in claim 8 wherein the liquid is a liquid metal and its surface tension is derived in order to measure the level of impurity in the metal.

* * * * *